United States Patent [19]
Hill

[11] 3,837,142
[45] Sept. 24, 1974

[54] HORSE BIT ASSEMBLY
[76] Inventor: Richard S. Hill, 302 W. Steadman, Sherman, Tex. 75090
[22] Filed: Aug. 23, 1973
[21] Appl. No.: 390,821

[52] U.S. Cl............................................. 54/6, 54/8
[51] Int. Cl............................................. B68b 1/04
[58] Field of Search...................... 54/7, 8, 6, 12, 13

[56] References Cited
UNITED STATES PATENTS

| | | | |
|---|---|---|---|
| 120,913 | 11/1871 | Vanauken | 54/8 |
| 1,158,126 | 10/1915 | Fowler | 54/7 |
| 2,421,173 | 5/1947 | Ulrich | 54/6 R |
| 2,512,244 | 6/1950 | Wolfe | 54/7 X |

Primary Examiner—Antonio F. Guida
Assistant Examiner—J. Q. Lever
Attorney, Agent, or Firm—Browne, Beveridge, DeGrandi & Kline

[57] ABSTRACT

For controlling and teaching a horse, a bit assembly is provided including a mouth bar adapted to be received in the horse's mouth; and a pair of L-shaped flanges fixed to opposite ends of the mouth bar to be positioned externally of the horse's mouth on opposite sides of the horse's head to limit movement of the mouth bar while in the horse's mouth. The upper ends of the flanges have apertures for attaching straps to fix the position of the bit assembly on the horse's head, while the lower ends of the flanges have apertures for attaching stopping reins or other lines used to control the horse. Riding reins are attached to the bit assembly by means of rings pivotally connected to each of the flanges adjacent opposite ends of the mouth bar. For applying pressure to nerves in the horse's nose or under the horse's jaw, a generally U-shaped swing bar is rotatably mounted to opposite ends of the mouth bar. Rings are fixed to opposite legs of the swing bar as well as the cross piece for attaching control cords or lines to the swing bar to secure it either across the nose of the horse or under the jaw of the horse depending on the type of control or training wished to be imposed on the horse. Liquid or other medicine may be introduced into the horse's mouth through the mouth bar which is formed with a tubular construction for receiving the liquid; the opposite ends of the mouth bar being provided with screw plugs for closing the mouth bar. When it is desired to introduce liquid into the horse's mouth, either one of the screw plugs is removed, and a liquid supply conduit such as a hose is inserted in the end of the mouth bar. From the interior of the mouth bar, the liquid enters into the horse's mouth by means of an aperture formed in the center of the mouth bar.

17 Claims, 4 Drawing Figures

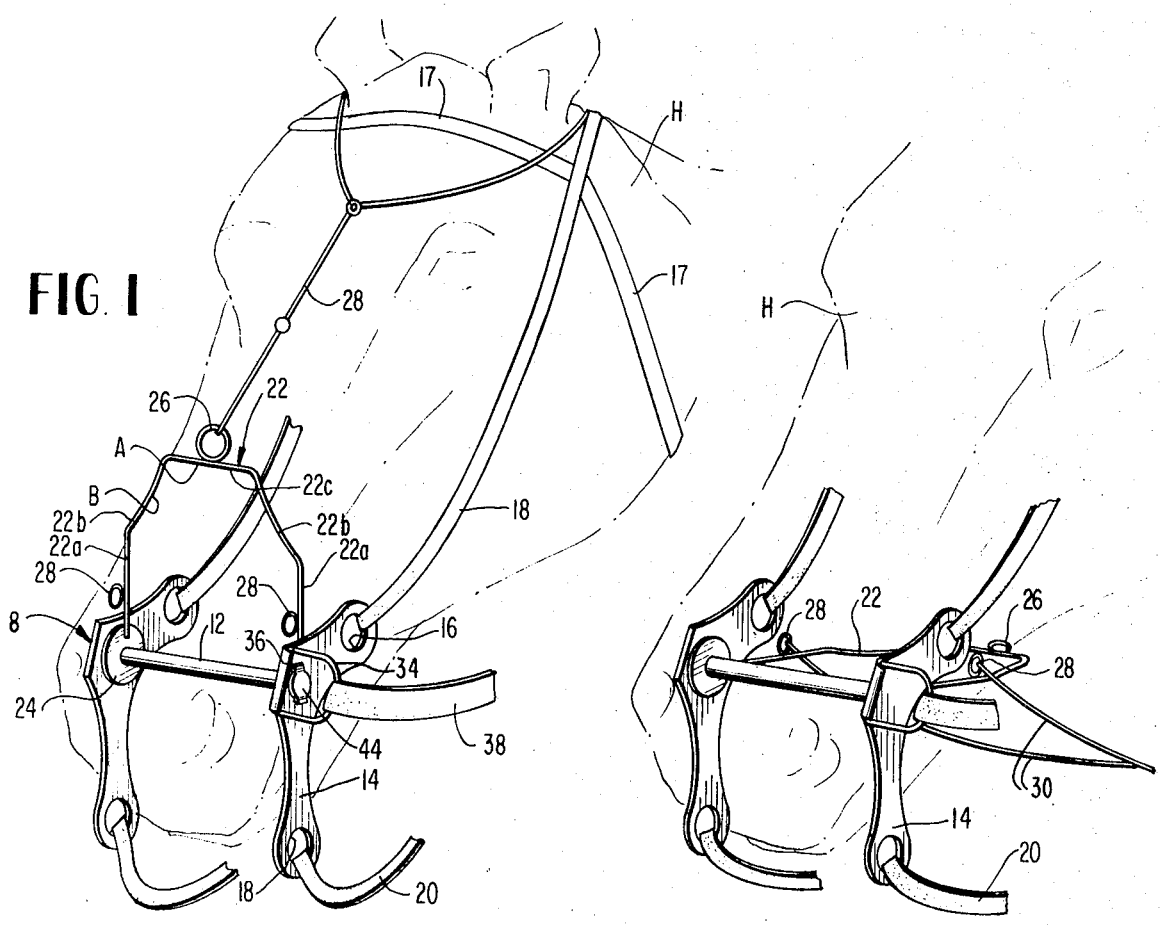
FIG. 1
FIG. 2
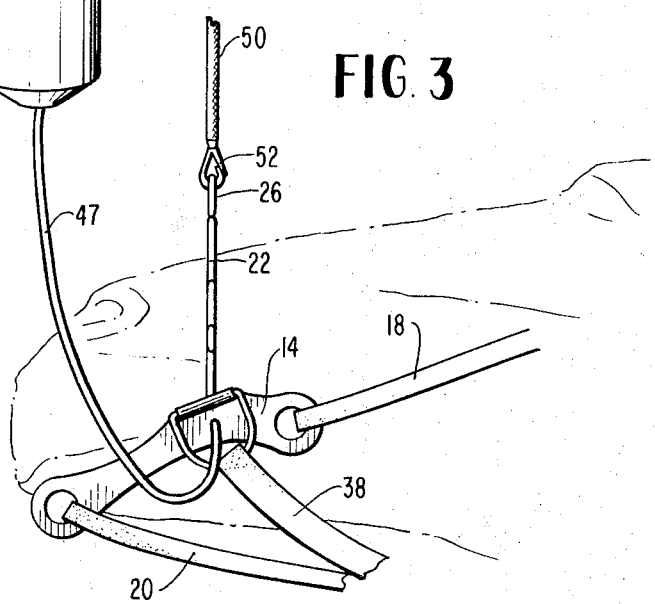
FIG. 3
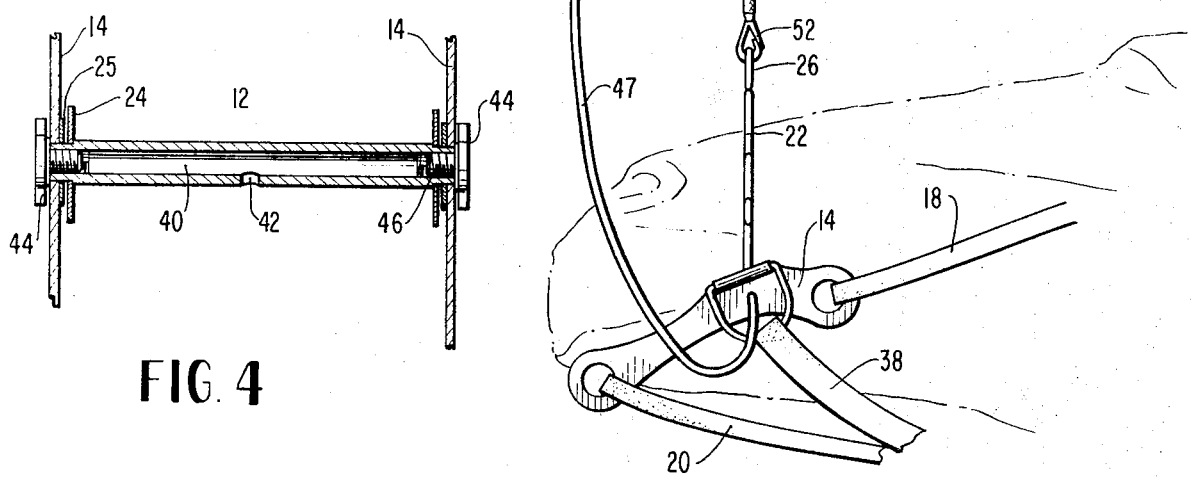
FIG. 4

HORSE BIT ASSEMBLY

OBJECTS OF INVENTION

The present invention generally relates to the art of controlling and training horses through the use of mouth bits or similar devices.

One of the objects of the present invention is to provide a novel bit assembly for controlling or training a horse without causing injury to the mouth of the horse. Included herein is the provision of such a bit assembly which relies on application of pressure to the horse's nerves in its head or neck.

A further object of the present invention is to provide such a bit assembly which may be employed to train young horses or break bad habits in old or fully grown horses, to prevent the horse from throwing his head, bucking, lunging, running away, etc. Further included herein is the provision of such a bit assembly which may be employed to break in young horses for riding and also to teach them to back or to stop on back feet. Also included is the provision of such a bit assembly which may be employed to set the horse's head in a desired raised position or lowered position.

A further object of the present invention is to provide such a bit assembly which may also be employed in doctoring the horses for transmitting medicine or other liquid into the horse's mouth through the bit assembly. Included herein is the provision of such a bit assembly which may be employed to hold the horse's head in a raised position during transmission of medicine into the horse's mouth through the bit assembly.

Another object of the present invention is to provide such a bit assembly which will achieve the above objects and yet may be easily applied and used on a horse without any special skill.

SUMMARY OF INVENTION

The above objects are achieved in one embodiment of the bit assembly of the present invention, including a tubular mouth bar adapted to be received in the horse's mouth. Fixed to the opposite ends of the mouth bar are a pair of inverted generally L-shaped flanges which when the bit assembly is in use, are positioned externally of the horse's mouth and prevent sliding movement of the mouth bar in the horse's mouth. The bit assembly may be secured to the horse's head by means of a stall or other similar strap arrangement including straps connected to apertures formed in the upper ends of the flanges. The lower ends of the flanges also have apertures for receiving stopping reins or other similar control lines or cords. Adjacent opposite ends of the mouth bar, a pair of rings are pivotally secured to the flanges respectively for attaching riding reins thereto.

In order to apply pressure to nerves in the horse's head or neck for controlling and training the horse, a swing bar is rotatably mounted to opposite end portions of the mouth bar to be moved into a first position across the horse's nose or a second position under the horse's jaw depending on the type of control desired. In one form, the swing bar includes a pair of legs which extend away from the mouth bar and include inwardly converging portions following the general contour of the horse's head, and a cross piece which is adapted to extend across the nose or under the jaw of the horse; the cross piece interconnecting the converging portions of the swing bar. In order to attach lines such as nylon cords to the swing bar to secure the same with respect to other portions of the horse, saddle, or harness portions, a plurality of rings are fixed to the swing bar. In one specific embodiment, one ring is rigidly secured to the center of the cross piece and a pair of rings are rigidly secured to intermediate portions of the legs of the swing bar.

In use, the swing bar may be swung into an upper position wherein it crosses over the horse's nose and is secured therein such as through a nylon cord attached to the ring on the cross piece. The nylon cord may be brought from the swing bar upwardly then extended outwardly into a Y configuration about the horse's ears and then drawn to set the horse's head in a desired upper position and then tied to the saddle horn for example. If the horse attempts to move out of the set position such as by moving its head or bucking etc., the swing bar will apply pressure to the nerves in the horse's head in or adjacent the nose to prevent the unwanted action of the horse's head. Moreover, such control is achieved without relying on pressure in the horse's mouth from the mouth bar which remains substantially in the same position. The only time the mouth bar moves is when pressure is applied through means of the stopping rein attached to the lower portions of the flanges. Such a maneuver may be employed while riding the horse to stop the horse or to prevent a runaway or for other control. Even in such a situation, when the stopping rein is applied, the mouth bar will rotate very slightly in the horse's mouth thereby avoiding any injury to the horse's mouth.

In order to set the position of the horse's head in a desired down position, the swing bar may be moved under the horse's head behind the jaw and tied in that position by nylon cords for example attached to the rings on the legs of the swing bar. The nylon cords are anchored to a suitable location on the horse such as on the breast harness for example.

In certain situations control lines such as nylon cords may be attached to all three rings of the swing bar and several different uses of the horse bit assembly may be made utilizing the swing bar so as to achieve a desired control.

For purposes of introducing medicine or other liquid into the horse's mouth, the mouth bar has a tubular hollow construction for receiving the liquid or medicine through either end of the mouth bar. The ends of the mouth bar are closed by screw plugs received in internal threads formed in the opposite ends of the mouth bar. To introduce liquid or medicine into the mouth bar, either screw plug may be removed, and a small hose or other conduit inserted in the end of the mouth bar through which the liquid or medicine may be introduced into the mouth bar. Liquid or medicine from the mouth bar is fed into the horse's mouth through an outlet aperture formed in the wall of the mouth bar intermediate the ends thereof. During introduction of the liquid or medicine into the horse's mouth, the swing bar may be employed to hold the horse's head in a raised position to facilitate the feeding of the liquid or medicine.

DRAWINGS

Other objects and advantages of the present invention will become apparent from the following more detailed description taken in conjunction with the attached drawings in which:

FIG. 1 is a perspective view of a bit assembly embodying the present invention and shown mounted in one position on a horse's head in dotted lines;

FIG. 2 is a view similar to FIG. 1 but showing the bit assembly in an opposite lower position on the horse's head;

FIG. 3 is an end view of the bit assembly shown mounted on a horse's head for purposes of introducing a liquid or medicine into the horse's mouth from a supply source and conduit also shown; and FIG. 4 is a longitudinal cross-sectional view of the bit assembly showing the hollow construction of its mouth bar.

DETAILED DESCRIPTION

Referring to the drawings in detail, there is shown for illustrative purposes only, a bit assembly generally designated 8 embodying the present invention for use on a horse designated H. Bit assembly 8 includes a mouth bar 12 having a cylindrical tubular construction and adapted to be received in the horse's mouth to extend across the same as illustrated in FIGS. 1 and 2. Mouth bar 12 is rigid and made of a suitable strong material such as steel with a suitable resistant external coating such as stainless steel which will not harm the horse. In one commercial embodiment, mouth bar 12 has a diameter of approximately five-eighths of an inch. Fixed to the opposite end portions of mouth bar 12 is a pair of inverted generally L-shaped flanges 14 made from suitable rigid material such as plate steel which may also be stainless steel. Flanges 14 may be fixed to mouth bar 12 in any suitable manner such as by welding, and with the flanges 14 extending in parallel planes to each other at right angles to mouth bar 12.

Bit assembly 8 is mounted to the horse's head with the mouth bar 12 in the proper position by means of any suitable head stall including a cross strap 17 and a pair of straps 18 extending along the opposite sides of the horse's head and attached to upper portions of flanges 14 by means of apertures 16 formed in the latter. The lower extremities of flanges 14 are also formed with apertures 18 for attaching stopping reins 20 for use in controlling the horse as will be described subsequently. Flanges 14 are dimensioned so that the straight line distance between the centers of apertures 16 and 18 is approximately 6½ inches, and the upper and lower flange portions extended at an angle of approximately 135° to each other.

In order to apply pressure to the nerves of the animal's head or neck to control or train the same as will be described, a pressure bar in the form of a swing bar generally designated 22, is rotatably mounted on the opposite end portions of mouth bar 12. In the embodiment shown, pressure bar 22 includes a pair of opposite legs including lower portions 22a extending away from the mouth bar 12 at the opposite ends thereof, upper portions 22b extending inwardly from lower portions 22a at an angle, and a yoke or cross piece portion 22c constituting the top of the pressure bar and extending between and joining leg portions 22b. Pressure bar 22 in a commercial embodiment, is made from rigid cylindrical rod-like material having a diameter of approximately three-sixteenths inch with portions 22a, 22b and 22c all being rigid with respect to each other. Pressure bar 22 and particularly converging portions 22b and yoke portion 22c thereof, are adapted to engage portions of the animal's head or neck to apply pressure on the nerves therein for controlling or training the animal as will be described. In this regard, it is preferred that angular portions 22b of pressure bar 22 extend concavely along an arc so as to provide concentrated areas of contact for example with portions of the animal's head indicated by B. Yoke piece 22c when in position shown in FIG. 1, is adapted to apply pressure to the nose portion of the horse.

In the specific embodiment shown, swing bar 22 is mounted to mouth bar 12 by means of discs 24 having apertures therein receiving end portions of mouth bar 12 with the discs being rotatable about mouth bar 12. The lower portions 22a of the swing bar legs are rigidly secured to discs 24 respectively in any suitable manner such as by slotting the extremities of portions 22a to receive discs 24, and by welding the slotted portions to discs 24. In one commercial embodiment, the distance between mounting discs 24 is about 3¾ (inches) which corresponds to the length of the mouth bar 12 therebetween; while the height of yoke piece 22c of the swing bar from mouth bar 12 is approximately 5½ (inches).

For attaching riding reins 38 to the bit assembly for use in riding the horse, a pair of rings which preferably are steel rings 34 are pivotally mounted to the flanges 14 in a position shown in the drawings. In one embodiment, rings 34 have a generally D-shape including a straight portion which is rotatably mounted in sleeves 36 fixed such as by welding to intermediate edge portions of flanges 14 as shown in FIGS. 1 and 2.

In order to permit medicine or other liquid to be introduced into the horse's mouth through the bit assembly, mouth bar 12 is formed with a tubular construction as indicated so as to have an internal through-passage 40 shown in FIG. 4. The opposite ends of mouth bar 12 are formed open and with internal screw threads to receive screw plugs to close the opposite ends of passage 40 as shown in FIG. 4. Screw plugs include enlarged head portions 44, and internal threaded plug portions 46 which fit into the opposite ends of passage 40 for closing the same. Liquid fed into passage 40 of mouth bar 12 is introduced into the horse's mouth through an outlet port 42 formed radially in the side wall of mouth bar 12 preferably in the center between the ends thereof as shown in FIG. 4. Liquid or medicine is fed into mouth bar 12 by first removing either plug 44, 46 and inserting a hose or other conduit 47 into one of the ends of mouth bar 12. As shown in FIG. 3, liquid or medicine may then be fed from a supply container generally designated 48 and through conduit 47. It is preferred that when introducing the liquid or medicine into the horse's mouth through the bit assembly, that the head of the horse be held in raised position. This may easily be accomplished by utilizing the swing bar 22 as shown in FIG. 3 where it is in raised position over the horse's nose and connected to a cable or cord 50 by means of a hook fastener 52. Cable 50 may be placed about an upper beam or support in the horse's stall and raised sufficiently until the horse's head is moved into the proper elevated position.

The bit assembly of the present invention may be used in various ways to control or train a horse. In one use, when it is desired to maintain the horse's head in a certain up or raised position, swing bar 22 is swung into position shown in FIG. 1 wherein yoke cross piece 22c extends closely over the horse's nose and with portions 22d closely adjacent opposite sides of the horse's head. A cord such as a nylon cord 28 fixed to ring 26 on yoke piece 22c may then be drawn upwardly along the horse's head then into a Y around the horse's ears and then drawn back to position the horse's head in the right position and then anchored to the horn of a saddle for example. Should the horse lunge or lower its head or buck, portions 22b and 22c of the pressure bar will engage the nerves in the horse's head at points B and A for example to apply pressure to the horse's head to prevent the unwanted movement of the horse's head.

Referring to FIG. 2, to set the horse's head in a desired down position, swing bar 22 is swung under the horse's head behind the jaw, and nylon cords 30 attached to rings 28 are drawn to position the horse's head in the desired down position. Cords 30 are then secured to an appropriate part of the saddle or breast strap. Should the horse lunge or attempt to raise its head out of the set position, portions 22b, 22c and ring 26 will apply pressure to the nerves of the horse to prevent the unwanted movement.

In order to make a horse stand still while shoeing, doctoring, wounds, etc. a 20 inch nylon cord with a loop in its end is threaded through rings 28 in the bottom of the swing bar. The cord is doubled under the horse's lip and tensioned and tied. A small rope with a ring in one end which will slip easy, is then threaded through ring 26 at the top of the swing bar, and then arranged in a figure eight under the jaws and over the neck of the horse with the end that has the ring in it located about the top of the horse's neck on the right side. The other end of the rope is then run through the ring and tensioned. The reins may then be taken in one hand and the rope in the other hand so that the rope may be pulled to apply as much pressure as needed to make the horse stand still.

In breaking in a young horse for riding, riding reins 38 may be held together with stopping reins 20 with the swing bar 22 shown in the position FIG. 1. Should the horse attempt to run away, the stopping reins 20 may be pulled back to apply pressure to the horse's nose by means of pressure bar 22. Although in this maneuver, the mouth bar 12 will move slightly when stopping reins 20 are pulled, the movement of the mouth bar 12 will not be sufficient to injure the horse's mouth. The bit assembly has several other uses which will become apparent to those skilled in the art.

What is claimed is:

1. A bit assembly for controlling an animal such as a horse comprising in combination, a mouth bar adapted to be received in the animal's mouth, a pair of flanges respectively rigidly fixed to opposite end portions of the mouth bar and each having means including a pair of apertures spaced generally on opposite sides of said mouth bar for connecting control lines thereto, a generally U-shaped swing bar rotatably mounted on the mouth bar for rotation about the axis of the mouth bar to be positioned over the nose of an animal or under the head of the animal for applying pressure to the animal to control the animal, said swing bar being rigid and having means for attaching lines thereto for fixing the control bar in a predetermined position on the animal's head.

2. The bit assembly defined in claim 1 wherein said mouth bar is hollow and has an inlet port communicating with the interior of the bar for introducing liquid or medicine into the animal's mouth through the mouth bar, said mouth bar having an outlet aperture intermediate its ends and communicating with the interior of the mouth bar for conveying liquid or medicine from the mouth bar into the mouth of the animal.

3. The bit assembly defined in claim 2 wherein said inlet port is in one end of said mouth bar, and wherein there is further included, a removable plug received in said one end of the mouth bar to close the inlet, said removable plug being removable to open the inlet for introducing into the mouth bar liquid or medicine for introduction in the animal's mouth.

4. The bit assembly defined in claim 3 wherein the other end of said mouth bar has a removable plug closing the other end of the mouth bar.

5. The bit assembly defined in claim 1 further including a pair of rings connected to said flanges respectively for attaching riding reins thereto.

6. The bit assembly defined in claim 1 wherein said flanges have a generally L-shape and extend generally at right angles to the mouth bar.

7. The bit assembly defined in claim 1 wherein said means for attaching control lines to the swing bar includes loops fixed to the swing bar.

8. The bit assembly defined in claim 7 further including rings respectively pivotally attached to the flanges for attaching riding reins thereto.

9. The bit assembly defined in claim 1 wherein said swing bar includes opposite legs interconnected by a cross piece, and wherein said means on said swing bar for attaching control lines thereto includes a first loop fixed to the cross piece and at least one additional loop fixed to one of the legs.

10. The bit assembly defined in claim 9 wherein said swing bar includes two loops respectively fixed to said legs thereof.

11. The bit assembly defined in claim 10 wherein said loops are rigidly fixed to the swing bar.

12. The bit assembly defined in claim 9 wherein said legs and cross piece of the swing bar are rigid and rigidly interconnected.

13. A bit assembly for controlling an animal such as a horse comprising in combination, a rigid mouth bar adapted to be received in and across the animal's mouth, a pair of mounting members respectively rigidly fixed to opposite end portions of the mouth bar and having means for connecting control lines thereto, a generally U-shaped swing bar including leg portions, a rigid cross piece interconnecting the leg portions at one of their ends and means mounting the leg portions at their opposite ends for rotation about opposite end portions of said mouth bar, said swing bar being dimensioned to be positioned over the nose of the animal or under the head of the animal for applying pressure thereto to control the animal, said swing bar having first means on said cross piece thereof for attaching control lines to the swing bar for fixing the swing bar in predetermined position on the animal's head to control and set the position of the animal's head.

14. The bit assembly defined in claim 13 wherein said means mounting the leg portions of the swing bar for rotation on the mouth bar are disc-like members having apertures therein rotatably receiving the mouth bar and wherein said leg portions of the swing bar are fixed to said disc-like members.

15. The bit assembly defined in claim 14 wherein said swing bar has second and third means on said leg portions thereof for securing a control line across the nose of the animal or under the neck of the animal.

16. The bit assembly defined in claim 15 wherein said mounting members are flanges projecting generally at right angles from the mouth bar and wherein said means for connecting control lines to the mounting members include apertures located in opposite end portions of each of the flanges and a ring pivotally connected to each of the flanges intermediate the apertures thereof.

17. The bit assembly defined in claim 13 wherein the leg portions of the swing bar converge towards the cross piece thereof and are rigidly connected to the cross piece.

* * * * *